(12) United States Patent
Teichrob et al.

(10) Patent No.: US 8,944,740 B2
(45) Date of Patent: Feb. 3, 2015

(54) MOBILE MATERIAL HANDLING AND METERING SYSTEM

(75) Inventors: Gary Teichrob, Chilliwack (CA); Scott Mason, Cultus Lake (CA); Dave Keck, Calgary (CA); James Easden, Chilliwack (CA)

(73) Assignee: Ty-Crop Manufacturing Ltd., Rosedale, British Columbia (CA)

( * ) Notice: Subject to any disclaimer, the term of this patent is extended or adjusted under 35 U.S.C. 154(b) by 1109 days.

(21) Appl. No.: 12/909,357

(22) Filed: Oct. 21, 2010

(65) Prior Publication Data
US 2012/0099954 A1 Apr. 26, 2012

(51) Int. Cl.
B65G 67/36 (2006.01)
B65G 63/00 (2006.01)

(52) U.S. Cl.
CPC .............. B65G 63/008 (2013.01); B65G 67/36 (2013.01); *Y10S 414/132* (2013.01)
USPC ............ 414/332; 414/268; 414/582; 414/919

(58) Field of Classification Search
USPC ......... 414/268, 332, 355, 356, 474, 476, 482, 414/483, 573–575, 582, 919
See application file for complete search history.

(56) References Cited

U.S. PATENT DOCUMENTS

| | | | |
|---|---|---|---|
| 3,265,232 A * | 8/1966 | Lythgoe | 414/482 |
| 3,314,557 A * | 4/1967 | Sackett, Sr. | 414/269 |
| 3,753,506 A * | 8/1973 | Palmer et al. | 414/332 |
| 3,934,739 A * | 1/1976 | Zumsteg et al. | 414/332 |
| 4,187,047 A | 2/1980 | Squifflet, Sr. | |
| 4,198,186 A | 4/1980 | Holdren et al. | |
| 4,268,208 A | 5/1981 | Hankins et al. | |
| 4,330,232 A * | 5/1982 | McClaren | 198/306 |
| 4,337,014 A | 6/1982 | Farnham | |
| 4,482,281 A | 11/1984 | Musil | |
| 4,491,216 A * | 1/1985 | Sawby | 198/861.4 |
| 4,561,821 A | 12/1985 | Dillman | |
| 4,568,239 A * | 2/1986 | Sims | 414/809 |
| 4,917,560 A | 4/1990 | Murray et al. | |
| 4,944,646 A * | 7/1990 | Edwards et al. | 414/332 |
| 5,087,155 A | 2/1992 | Herman et al. | |
| 5,125,771 A | 6/1992 | Herman et al. | |
| 5,203,628 A | 4/1993 | Hamm | |
| 5,277,489 A | 1/1994 | Hamm | |
| 5,339,996 A | 8/1994 | Dubbert et al. | |
| 5,427,497 A | 6/1995 | Dillman | |
| 5,634,716 A | 6/1997 | Westall et al. | |
| 6,186,654 B1 | 2/2001 | Gunteret, Jr. et al. | |

(Continued)

OTHER PUBLICATIONS

"Sand Silo Sites", FB Industries Inc., Winkler, MB, Canada; Nov. 12, 2010.

*Primary Examiner* — James Keenan
(74) *Attorney, Agent, or Firm* — Holland & Hart, LLP

(57) ABSTRACT

A method and system for handling granular material, such as proppant used in hydraulic fracturing in well drilling, is provided. In an operational configuration, a delivery module having conveyors receives and conveys granular material to a delivery location, and one or more mobile storage modules receive, hold and dispense granular material downward to the delivery module. The mobile storage modules comprise a raised, angular container portion for holding granular material. Each module may comprise a rock-over chassis for support against ground. In a transportation configuration, each of the delivery modules and mobile storage modules are separately transportable as semi-trailers. System redundancy features such as hydraulic power packs are also provided for.

20 Claims, 12 Drawing Sheets

(56) References Cited

U.S. PATENT DOCUMENTS

| | | |
|---|---|---|
| 6,293,689 B1 | 9/2001 | Guntert, Jr. et al. |
| 6,527,428 B2 | 3/2003 | Guntert, Jr. et al. |
| 6,986,294 B2 | 1/2006 | Fromme et al. |
| 2008/0008562 A1 | 1/2008 | Beckel et al. |
| 2008/0179054 A1 | 7/2008 | McGough et al. |

* cited by examiner

MOBILE MATERIAL HANDLING AND METERING SYSTEM

FIELD OF THE INVENTION

The present invention pertains in general to material handling systems and in particular to a mobile material handling and metering system for storing and delivering granular material, and an associated method.

BACKGROUND

Granular material, such as sand, is used in bulk quantity in a number of applications. For example, in hydraulic fracture drilling by oil and gas and other industries, fracturing fluid, along with a granular proppant material such as sand and/or ceramics, is pumped into a drill well to create and prop open fractures in rock. Often, activities requiring large amounts of granular material are performed in a remote location, requiring granular material to be shipped in for example by road, rail or water.

For such activities, it is desirable to have sufficient and often large amounts of granular material readily available for adequately reliably carrying out operations. For hydraulic fracture drilling, storage facilities may be required, for example, to hold 50,000 cubic feet of proppant, and hence must be adequately large, as well as capable of supporting the resulting weight of proppant. However, in many cases, granular materials are only required over a limited time period, for example during the drilling operations. Thus, large, permanent on-site storage facilities for the required granular materials are often not economical.

Typically, proppant is stored at a well site in fixed vertical silos and supplied by a dry-bulk tanker and blown into the silo. This method of storage requires that the silos are transported on flat-deck trailers and hoisted into position using large cranes. The set-up time for this type of operation may be extensive, for example lasting on the order of days. Additionally, the silo filling operation may require a dry-bulk blower, which is costly, noisy and creates an undesirably large amount of dust. Furthermore, limited site space may place restrictions on overall size of this type of system, and vehicle compliance regulations may limit overall dimensions of components, such as silos, of system which are to be transported by vehicles such as flat-deck trailers.

United States Patent Application Publication No. 2008/0008562 discloses a method of transporting and storing an oilfield proppant, wherein proppant is transported to and accumulated at a storage facility. However, the storage facility is in the form of a large building which is not well-suited for portability.

U.S. Pat. No. 6,293,689 discloses a multi-trailer mobile concrete batching and mixing plant, including a concrete silo trailer and an aggregate trailer. However, this plant comprises a specific, closed arrangement of trailers and is limited in the amount of material that can be stored and in the rate at which material can be added or removed from the plant.

United States Patent Application Publication No. 2008/0179054 discloses a method and system for expandable storage and metering of proppant or other materials. A portable storage and metering device is transported to a well site and there expanded and filled with proppant, which is metered out as required. However, this approach is limited in scale of proppant material that can be stored and metered.

Therefore there is a need for a method and system for mobile storage and delivery of granular material that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and system handling granular material. In accordance with an aspect of the present invention, there is provided a system for handling granular material, the system comprising: a delivery module configured, in a delivery module operational configuration, to receive said granular material and to convey said granular material to a predetermined delivery location; and one or more mobile storage modules adjacent to the delivery module, each of the one or more mobile storage modules configured, in a mobile storage module operational configuration, to hold and dispense said granular material downward to the delivery module.

In accordance with another aspect of the present invention, there is provided a delivery module for handling granular material, the delivery module configured, in a delivery module operational configuration, to receive said granular material from one or more mobile storage modules and to convey said granular material to a predetermined delivery location, the one or more mobile storage modules adjacent to the delivery module, each of the one or more mobile storage modules configured, in a mobile storage module operational configuration, to hold and dispense said granular material downward to the delivery module.

In accordance with another aspect of the present invention, there is provided a mobile storage module for handling granular material, the mobile storage module configured, in a mobile storage module operational configuration, to hold and dispense said granular material downward to an adjacent delivery module, the delivery module configured, in a delivery module operational configuration, to receive said granular material from the mobile storage module and to convey said granular material to a predetermined delivery location.

In accordance with another aspect of the present invention, there is provided a method for handling granular material, the method comprising: providing a delivery module configured to receive said granular material and to convey said granular material to a predetermined delivery location; and providing one or more mobile storage modules adjacent to the delivery module, each of the one or more mobile storage modules configured to hold and dispense said granular material downward to the delivery module.

BRIEF DESCRIPTION OF THE FIGURES

These and other features of the invention will become more apparent in the following detailed description in which reference is made to the appended drawings.

DETAILED DESCRIPTION OF THE INVENTION

Definitions

The term "granular material" is used to define a flow-able material comprising solid macroscopic particles, such as sand, gravel, or the like.

The term "proppant" is used to define a granular material used in drilling, for example by oil and gas industries. Proppant comprises appropriately sized and shaped particles which may be mixed with fracturing fluid to "prop" fractures open after a hydraulic fracturing treatment. Proppant may comprise naturally occurring sand grains of a predetermined size, or engineered materials, such as resin-coated sand, ceramic materials, sintered bauxite, or the like.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

An aspect of the present invention provides for a system for handling granular material, for example for storage and delivery of proppant for use in hydraulic fracturing at a drill well site. The system comprises a delivery module configured to receive said granular material at a reception area thereof and to convey said granular material to a predetermined delivery location. The delivery module may comprise one or more mobile powered conveyor systems, for example at least partially for substantially horizontal conveyance of the granular material. The system further comprises one or more mobile storage modules, each configured to hold said granular material and to dispense said granular material downward to the delivery module. In an operational configuration, the mobile storage modules are arranged adjacent to the delivery module. In a transportation configuration, the mobile storage modules may be configured and towed as semi-trailers and may comprise a container pivotably connected to a base, which may be raised into position for gravity-assisted dispensing of granular material. The delivery module may also further be configured in a transportation configuration for towing as a semi-trailer.

Another aspect of the present invention provides for a delivery module for handling granular material, the delivery module as described above. Another aspect of the present invention provides for a mobile storage module for handling granular material, the mobile storage module as described above.

Figure 1:
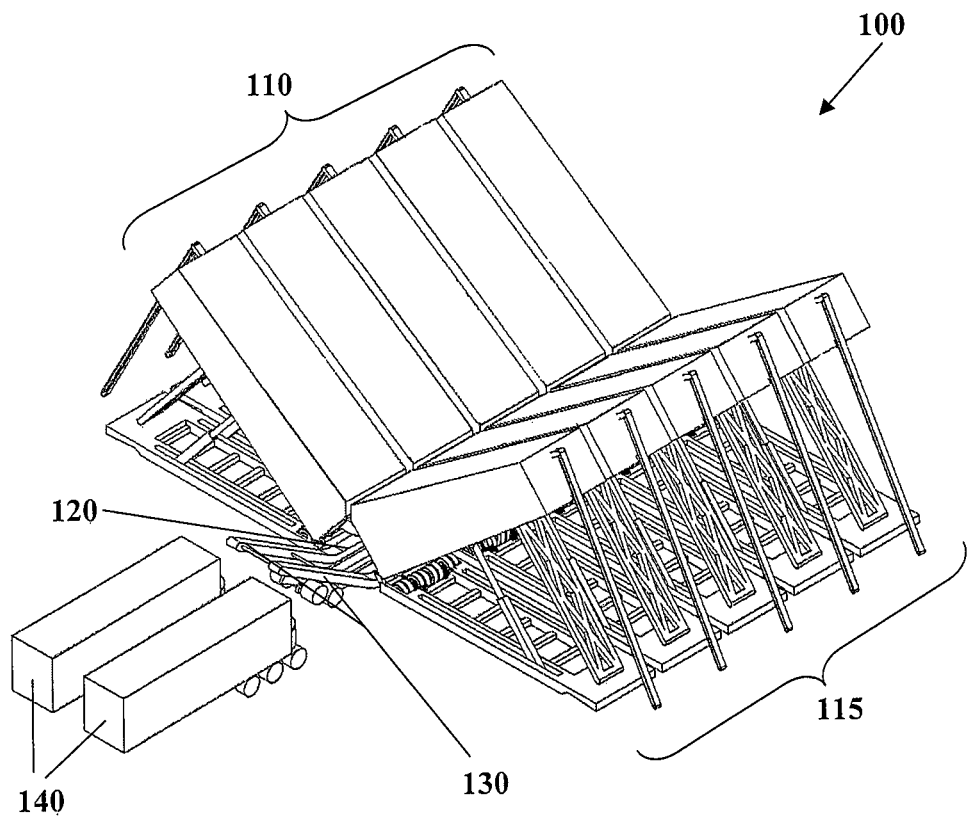
FIG. 1 illustrates a system for handling granular material, in accordance with embodiments of the invention.

FIG. 1 illustrates a system 100 for handling granular material in accordance with embodiments of the present invention. The system 100 is illustrated as arranged in an operational site configuration, with a plurality of mobile storage modules 110, 115 arranged around a delivery module 120. As shown, there are five mobile storage modules 110 in a first bank on one side of the delivery module 120, and five mobile storage modules 115 in a second bank on another side of the delivery module 120 opposite the first bank. However, this number may be reduced or increased. If the number is increased, the delivery module portion 120 may be expanded in length, for example by adding one or more additional conveyors arranged end-to-end. Other arrangments, such as providing plural delivery modules in parallel, may also be used. The mobile storage modules 110, 115 are arranged so that they may individually discharge granular or flow-able material such as proppant onto one or more, centrally located main conveyors of the delivery module 120. The granular material is conveyed by the main conveyors to one or more discharge conveyors 130, which convey the material to a height appropriate to allow the material to feed one or more blender modules 140. Each blender module 140 may be a mobile unit used to blend fracking chemicals, proppant and bulk fluid. Alternatively, the discharge conveyors 130 may be configured for delivering granular material to another appropriate location or equipment, for example to re-load a bulk tanker during well-site decommissioning.

In some embodiments, there may be a substantially independently variable number of mobile storage modules provided on each side of the mobile storage module. For example, between zero and ten mobile storage modules may be arranged in a first bank along one side of a delivery module, and between zero and ten mobile storage modules may be arranged in a second bank along another side of a delivery module opposite the first bank. The number of mobile storage modules in the first and second bank need not be even. For example, two, three or four mobile storage modules may be arranged in the first bank, and five or six mobile storage modules may be arranged in the second bank.

An aspect of the present invention provides for a method for handling granular material. The method comprises providing a delivery module configured to receive said granular material and to convey said granular material to a predetermined delivery location. The delivery module may be transported to a desired site in a transportation configuration and then converted to an operational configuration for receiving and conveying the granular material. The method further comprises providing one or more mobile storage modules adjacent to the delivery module, each of the one or more mobile storage modules configured to hold and dispense said granular material downward to the delivery module. The mobile storage modules may be transported to a desired site in a transportation configuration and then converted to an operational configuration for holding and dispensing the granular material.

Embodiments of the present invention provide for robustness to component failure or mechanical breakdown by providing redundancies for one or more components. For example, the delivery module may comprise plural conveyor systems, and the system may be configured to facilitate continued operation in the event that one or more conveyor systems break down. As another example, each of the mobile storage modules may include interchangeable components, such as hydraulic power packs, which may be connected for use in another mobile storage module should that component of the other mobile storage module fail or break down. Plural components may be also used in series or parallel to augment specific operations.

Embodiments of the present invention may provide for one or more mechanical features facilitating operation of mobile storage modules and/or delivery modules. For example, one or more modules may comprise a rock-over chassis, which may operate as a semi-trailer chassis in the transportation configuration, and as a support structure engaging ground over an adequately large surface area in the operational configuration.

In embodiments of the present invention, each of the mobile storage modules and delivery modules are reconfigurable between transportation and operational configurations. In the transportation configuration, each module may be separately transportable in an adequately compact configuration. In the operational configuration, plural modules may be configured and arranged together for accepting, storing, conveying and delivering granular material.

Embodiments of the present invention are modular and expandable, which enables a configurable storage capacity for granular material such as proppant, and/or a configurable capacity for adding and/or removing granular material. The number of mobile storage modules may be adjusted as required, to provide the appropriate capacity. In some embodiments, additional delivery modules or delivery module expansion units may also be provided as desired. Excess storage modules may remain unused or may be used at another site to improve operational efficiencies. Each mobile storage module provides its own storage capacity, and plural mobile storage modules may be loaded with granular material at the same time, thereby facilitating quicker loading or reloading. In some embodiments, plural storage modules may further feed the delivery module at the same time, thereby providing granular material to the delivery module at a higher rate than from a single storage module.

At least some embodiments of the present invention may provide improvements in terms of operational efficiency, set-up time, transportation requirements, storage and asset tracking requirements, and the like, for example by requiring a relatively small number of component modules when compared with some prior art solutions.

Mobile Storage Module

The present invention comprises one or more mobile storage modules for holding and dispensing granular material. The number of storage modules utilized may be adjusted as needed for a given operation, from one to a predetermined maximum number which may depend at least in part on delivery module capacity. Each of the mobile storage modules may be reconfigurable between a transportation configuration and an operational or site configuration. In the transportation configuration, each mobile storage module may be configured as a separately transportable trailer or semi-trailer. In the operational configuration, each mobile storage module may be configured as a granular material storage container or silo.

In embodiments of the present invention, each mobile storage module comprises a frame and a container portion, such as an enclosed box, supported by the frame and pivotably coupled thereto. The mobile storage module frame may be referred to and/or associated with a chassis. The container portion is configured, for storing granular material and comprises an input port for receiving the granular material and an output port for dispensing the granular material. The container portion may be substantially enclosed on all sides, except for the input port and output port, which may comprise controllably-sized apertures. The mobile storage module may further comprise an actuating system configured to pivot the container between a lowered position and a raised position. In the raised position, the input port is located above the output port to allow the granular material to flow from input to output with assistance of gravity. The mobile storage module may further comprise a loading system, such as an in-feed elevator, conveyor, bucket conveyor, or the like, operatively coupled to the input port to facilitate loading of granular material into the container portion.

In some embodiments, the mobile storage module may comprise a discharge chute, gate valve, and/or variable discharge aperture valve, operatively coupled to the output port to facilitate controlled and metered flow of granular material from the container portion. The collective flow from container plural mobile storage modules, may also be controlled and metered by controlling and metering flows from plural mobile storage modules. The variable discharge chute, metering iris or aperture may facilitate remote, or manual, and ultimately combined, control of the rate of discharge from one or more storage units. A variable aperture at an output port may allow for a substantially continuous control of granular material flow from zero flow to a predetermined maximal flow.

In some embodiments, the mobile storage module may further comprise a hydraulic power pack for powering components such as the actuating system, loading system, and output port valves. In some embodiments, the mobile storage module may be configured into a transportation configuration corresponding to a trailer or semi-trailer complying with predetermined laws, regulations and/or and height and weight requirements, for transportation by a road tractor or other appropriate on-road, off-road, rail or water vehicle.

Figure 2:
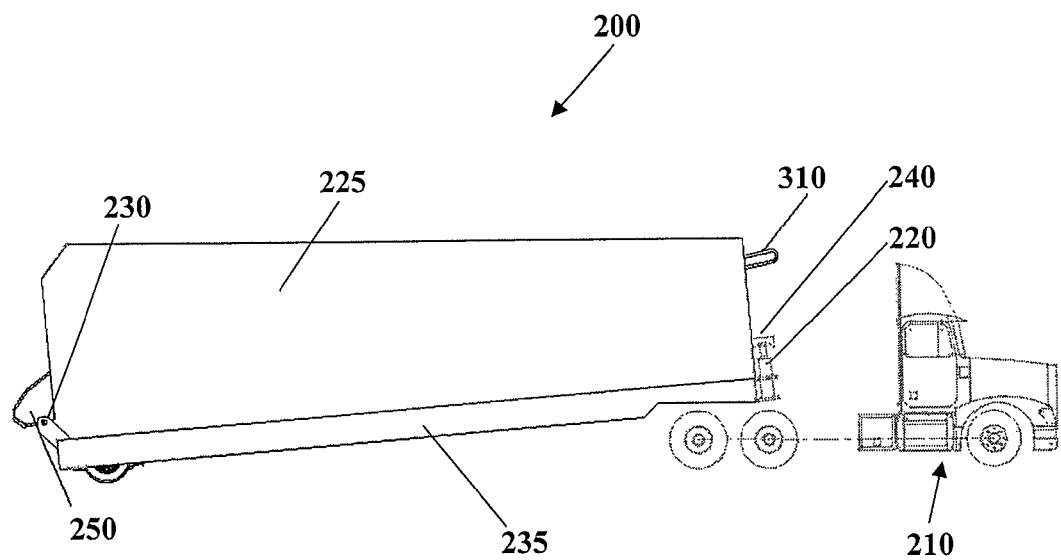
FIG. 2 illustrates a mobile storage module in a transportation configuration, in accordance with embodiments of the invention.

FIG. 2 illustrates a mobile storage module 200 arranged in a transportation configuration, as a semi-trailer mounted on a road tractor 210, in accordance with embodiments of the present invention. The semi-trailer may be configured to comply with applicable laws and regulations regarding size, length, weight, and the like.

In some embodiments, for example as illustrated in FIG. 2, the container portion 225 of a mobile storage module 200 is formed as a rigid box of a generally rectangular structure, tapered from front to rear so that the container top is at maximum allowable vehicle height when in the transportation configuration, in accordance with predetermined laws and/or transportation regulations. Other features illustrated in FIG. 2 are also described herein.

Figure 3:
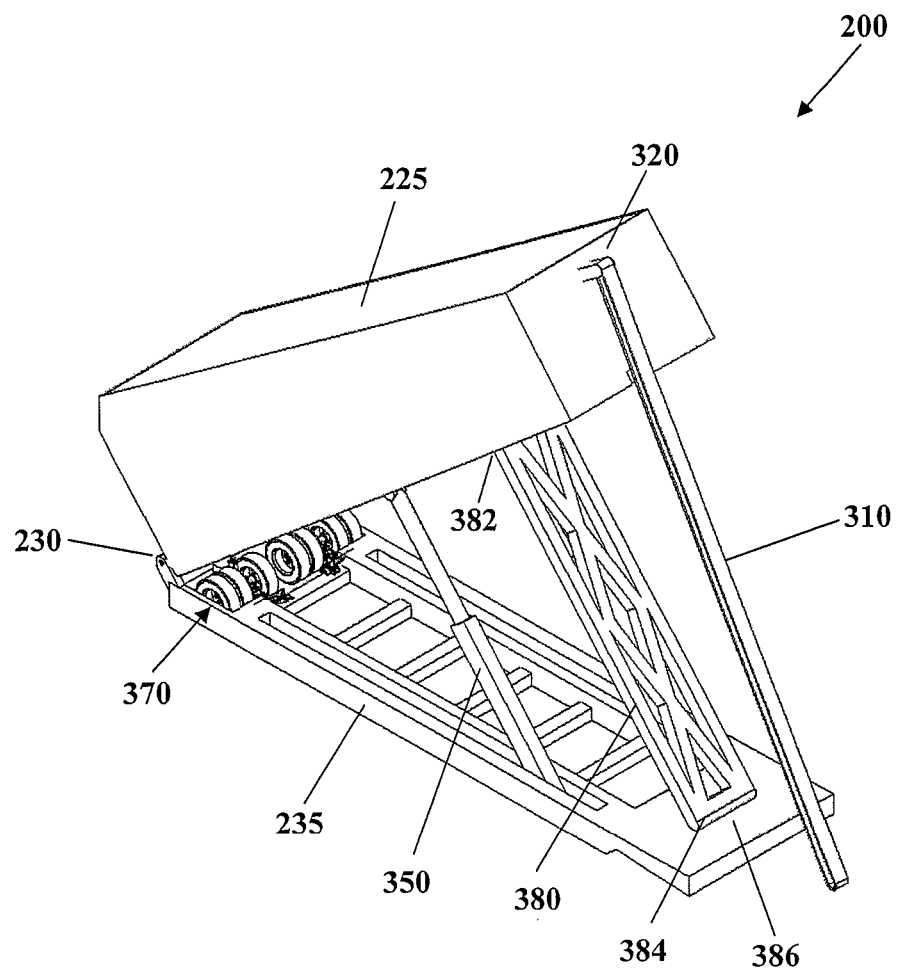
FIG. 3 illustrates a perspective view of a mobile storage module in an operational configuration, in accordance with embodiments of the invention.
Figure 4:
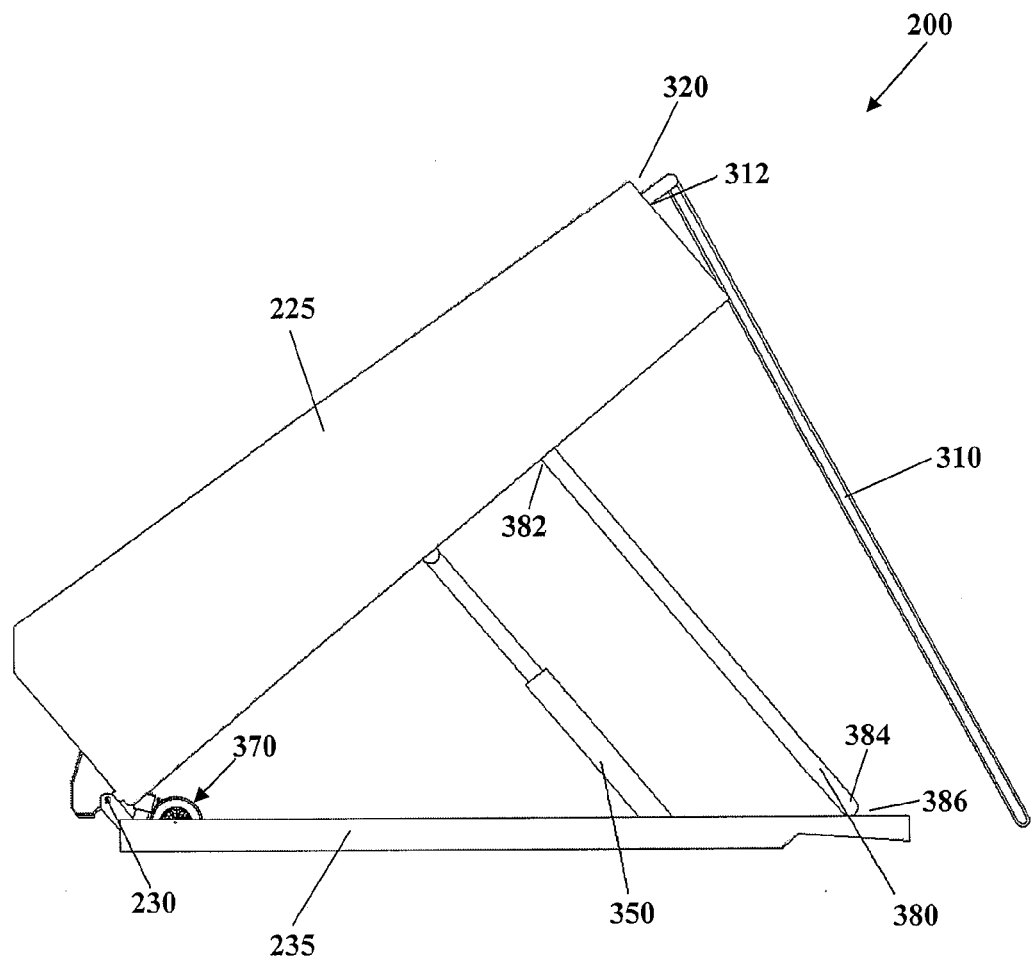
FIG. 4 illustrates an elevation view of a mobile storage module in an operational configuration, in accordance with embodiments of the invention.

FIGS. 3 and 4 illustrate, in perspective and elevation views, respectively, a mobile storage module 200 arranged in a site configuration as an erected silo, in accordance with embodiments of the present invention. The mobile storage module 200 is detached from a road tractor and set up at an appropriate location, for example adjacent to a delivery module and possibly one or more other mobile storage modules. A loading system such as an elevator 310 or other conveyor is connected to an input port 320. Granular material may be loaded onto the elevator 310 from an appropriate container vehicle. The elevator 310 transports the material to the input port 320, where it may be stored in the container portion 225, and/or flowed therethrough to an output port. The mobile storage module 200 comprises, at its base, a frame 235, which may be substantially rigid and may span approximately the unit's full length and width. The container portion 225 is raised into position by a actuating system, for example in the form of a hydraulic actuator 350, for example comprising a set of one or more hydraulic piston-cylinder assemblies, which are coupled to the container portion 225 and the frame 235 and controllably powered by a hydraulic power pack or other source of pressurized hydraulic fluid. The hydraulic actuators may be attached, via pin joints or other pivotable joints, at one end to the container portion 225 and at the other end to the frame 235, such that expansion of the hydraulic actuators 350 effects differential movement between the container portion 225 and frame 235 in an arc, thereby raising and pivoting the container portion 225 from the trailer chassis to a desired or predetermined angle. Embodiments of the present invention may be configured for pivoting the container portion to one or more predetermined or selectable angles, adequate for facilitating flow of material from the input port to the output port under gravity. Such an angle may depend on factors such as the material involved, material grain size. flow-ability, height availability, weight distribution requirements, and the like. In some embodiments, the container portion may be pivoted at an angle of about 40 degrees relative to the frame. In some embodiments, an agitator may be provided for agitating the container portion, thereby controllably increasing flow-ability of granular material at one or more predetermined angles.

As also illustrated in FIGS. 3 and 4, the container portion 225 may comprise a fully enclosed rigid box approximately dimensionally equal to the frame 235 in length and width. The container portion 225 may be attached to the frame 235 by way of a hinge 230, for example located rearward of the wheel axles 370. In another embodiment, the wheel axles 370 may be coupled to both the container portion 225 and the frame 235 and may act as a hinge therebetween.

In some embodiments, one or more hydraulic piston-cylinder assemblies or other substantially linear hydraulic actuators 350 are configured such that, in their collapsed state corresponding to the transportation configuration, one end is substantially higher than the other end. Thus, at commencement of expansion, the actuators can generate a sufficient vertical axis component of thrust to initiate movement of the container portion 225. For a given size of hydraulic actuator, this may be effected by positioning the upper end of the hydraulic actuator, for example a piston rod end thereof, substantially above the frame 340 and possibly into a region located within the convex hull of the container portion 225. In this arrangement, volume which could otherwise potentially be occupied by usable granular payload within the container portion 225 may, in some embodiments, be sacrificed to make room for a portion of the hydraulic actuator or actuators 350.

In some embodiments, the main hydraulic-actuators 350 are configured so as to be substantially parallel and within the frame 235 when in the transportation configuration, with a first end of the main hydraulic actuators 350 connected to the frame 235 and a second end coupled to a bottom surface of the container portion 225, for example by way of a yoke or lug extending below the container portion 225. In this arrangement, the hydraulic actuators 350 may then substantially lie outside of the convex hull of the container portion 225, thereby increasing potential granular material storage capacity thereof. A second set of one or more initiating hydraulic actuators, for example piston-cylinder assemblies oriented substantially vertically, may be provided, permanently or as needed, for initially raising the container portion 225 to an orientation at which the main hydraulic actuators 350 are able to provide sufficient vertical thrust to raise the box to its full height. At this point, the main hydraulic actuators 350 may take over the container portion load.

For example, as illustrated in FIG. 2, the initiating hydraulic actuators 220 may be located at an end of the container portion 225 opposite the hinge 230, the hydraulic actuators 220 supported by the frame 235. In some embodiments, the initiating hydraulic actuators 220 may be pin-jointed to the frame 235 at a lower end and bear, for example non-rigidly, against a box-mounted cup structure 240 at an upper end. At the point at which the main hydraulic actuators 350 take over lifting duty, the initiating hydraulic actuators 220 may reach maximum stroke and loose contact, at their upper ends, with the box-mounted cup structure 240.

In some embodiments, deployable rigid bracing 380, as illustrated in FIGS. 3 and 4, may be provided. The bracing 380 may be, for example, hinged at one end and free sliding at the other end. The bracing 380 may facilitate supporting the container portion 225 of a mobile storage unit 200 in a raised, operational configuration, thereby reducing or eliminating the need to maintain hydraulic power after the container portion is raised and the rigid bracing 380 locked into place.

In some embodiments, a rigid brace 380 may be provided for bracing the container portion 225 when in the raised position. As illustrated in FIGS. 3 and 4, a first end of the brace 380 may be pin jointed to the underside of the container portion 225 at a predetermined location 382, and a second end 384 of the brace 380 may be free to slide on and/or over the trailer chassis while raising the container portion 225. The second end 384 may be deployed and locked into place at a location 386 of the frame 235, for example by forcing the brace to arc over centre into a fixed pocket at the location 386 and then slightly lowering the container portion 225, and/or by pinning the second end 384 to the frame 235 at location 386.

In some embodiments, after raising the container portion 225, the hydraulic actuators 350 may be de-powered such that temperature induced hydraulic drift does not induce unexpected box loading. The rigid bracing structure 380 may therefore remove dependence upon the hydraulic actuators 350 after said raising. At full elevation the container portion 225 functions at a storage silo. As illustrated, the container portion 225 need not be fully vertical, but may be configured at an angle such as about 40 degrees. The system may provide for a set of mobile self-deploying silos forming a storage accumulator of variable capacity.

In embodiments of the present invention, the front end of the container portion includes an input port through which the container portion may be loaded with granular material, for example input port 320 as illustrated in FIG. 3. In some embodiments, the front end of the container portion may further include an opening through which the loading system, for example elevator 310 illustrated in FIG. 3 may be loaded for storage and transportation when in the transportation configuration. The stored elevator 310 is illustrated in FIG. 2.

As further illustrated in FIGS. 2 and 4, a discharge chute 250 may be provided at the rear of the container portion 225. The discharge chute 250 is configured in-line and in fluid communication with the output port and is oriented and located to position discharged granular material toward the delivery module for reception thereby. For example, the discharge chute 250 may be positioned to discharge the granular material onto a discharge conveyor of the delivery module. In some embodiments, the discharge chute 250 may be positioned low and close to the discharge conveyor to reduce unused volume in the lowermost rear corner of the box.

Figure 5:
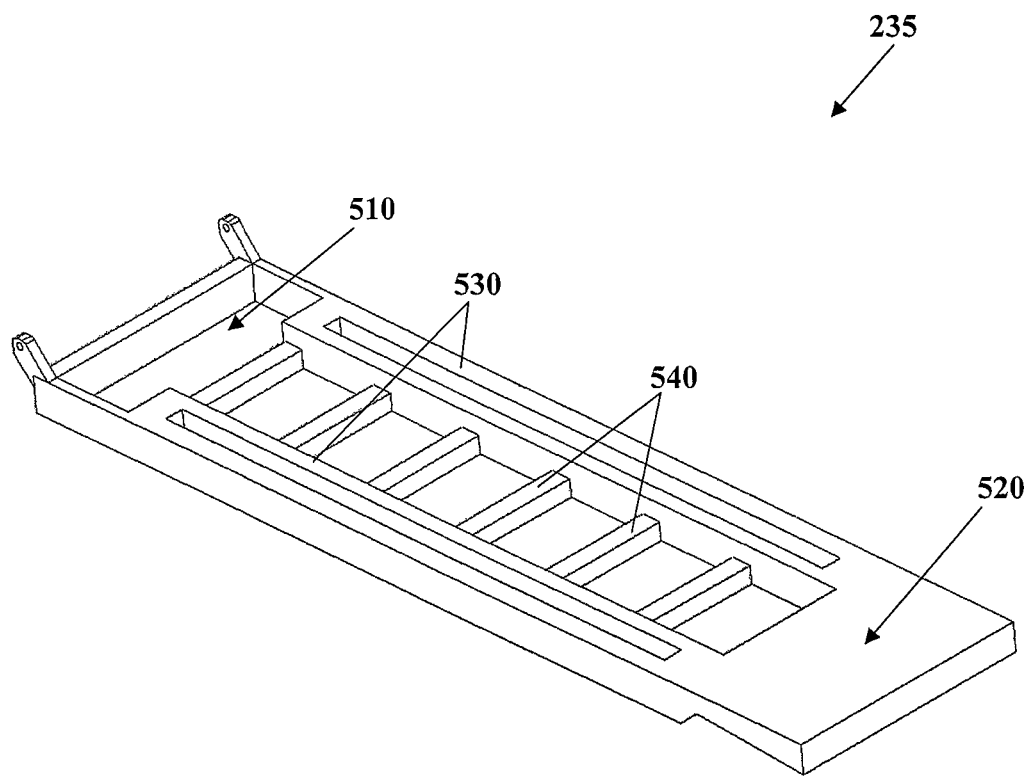
FIG. 5 illustrates a frame of a mobile storage module, in accordance with embodiments of the invention.

In some embodiments, as illustrated in FIG. 5, the frame 235 may be constructed from standard structural members, such as steel beams, to form a ladder frame chassis. At one end of the chassis, a set of one or more axles may be fitted at location 510. At the other end of the chassis, a kingpin and coupler structure, or other structure suitable for coupling to a standard or non-standard truck fifth wheel may be provided at location 520.

FIG. 5 further illustrates the frame or trailer chassis 235 comprising a series of longitudinal beams 530 and transverse cross-members 540 oriented to form a rock-over chassis, in accordance with embodiments of the present invention. The chassis may incorporate, toward the front end 520 a coupler structure with a standard SAE kingpin and toward the rear end 510 a suspension assembly and one or more axles and wheels operatively coupled thereto. In some embodiments, the suspension assembly may be located and oriented such that by deflating air springs thereof, the frame 235 can be lowered into contact with the ground to form a full length bearing structure.

In some embodiments, the rock-over chassis front end and/or rear end may be lowered to ground by an external crane. In some embodiments, the present invention may comprise hydraulic landing legs operatively coupled to the frame or rock-over chassis. The hydraulic landing legs may extended to contact ground to support the frame 235 while the road tractor drives away, the legs then fully retracted for lowering of the chassis to ground. The frame or rock-over chassis may be configured to present adequate ground contact area so that the ground footprint pressure remains below a predetermined maximum level.

In some embodiments, the in-feed elevator 310, for example as illustrated in FIGS. 3 and 4, may be dimensioned such that the elevator 310 reaches from the input port 320 to substantially ground level, when the elevator 310 is fully deployed and the container portion 225 is elevated to its full height in an operational configuration. Thus, the elevator 310 can transport material from approximately ground level to the height of the input port 320. In some embodiments, the container portion 225 may be raised while empty, and subsequently loaded via the elevator 310 at full elevation, thereby decreasing lifting capacity requirements of the hydraulic actuators 350. In some embodiments, the elevator 310 may be tilted upward and inserted into the container portion 225 for stowage in the transportation configuration, for example as illustrated in FIG. 2.

In some embodiments, the in-feed elevator 310 comprises a continuous belt equipped with cleats, buckets or other features for conveying material upward to the input port. The conveyor belt may be contained within a rigid frame extending approximately the full length of the conveyor belt such that the frame allows the conveyor system to be non-continuously supported along its length. The frame may be hingedly coupled at the upper end to a fixed location on the container portion 225, and may be supported by deployable legs or wheels at its lower end to ground. The frame is configured with a predetermined structural rigidity to resist bending due to payload and system weight, and buckling due to belt tension.

In some embodiments, the in-feed elevator 310 may be deployable from a stored position within the container portion 225, for example stowed and deployed via the container portion input port 320 or another port. Such a port may be located at the upper front corner of the front face of the container portion. The in-feed elevator 310 may, in, deployment, be tilted, for example by a hinge, to an approximately vertical orientation such that the lowermost end of the belt is proximate to ground. In some embodiments, the deployed in-feed elevator 310 may be supplied with granular material by a standard low-elevation belly unloading conveyor directly from a series of bulk tankers or other bulk material transporters. In some embodiments, the in-feed elevator may be coupled, at an end proximate to the input port, to a set of one or more outboard, rollers. The outboard rollers may be located on both sides of the frame. A pair of channels, configured to accommodate the rollers therein, may also be provided inside of the container portion for stowage of the in-feed elevator in the transportation configuration. In some embodiments, a fixed roller, for example at location 312 as illustrated in FIG. 4, may be located at the lowermost edge of the port receiving the in-feed elevator, the fixed roller bearing against the underside of the in-feed elevator frame, thereby providing support during storage and deployment.

Figure 6:
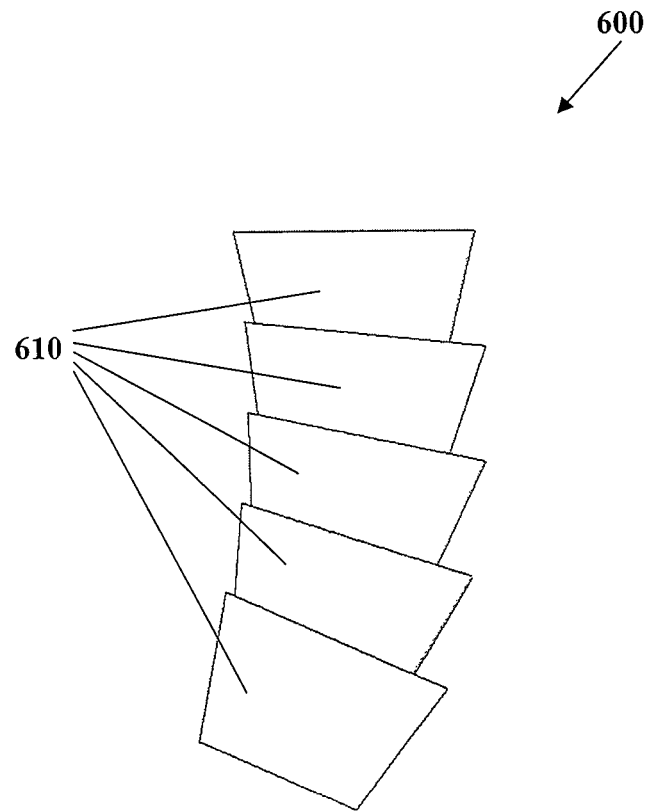
FIG. 6 illustrates a flexible chute for fitting to an output port of a mobile storage module, in accordance with embodiments of the invention.

FIG. 6 illustrates a flexible chute 600 provided in accordance with embodiments of the invention. The flexible chute 600 may be fitted to a discharge chute or output port of a mobile storage module for directing granular material to the delivery module. The flexible chute 900 comprises a set of interlocking conical members 610, such as approximately concentric diminishing cones, which are movable relative to each other so that the chute 600 output may be configurably located as needed for granular material discharge.

The rear end of the container portion of a mobile storage module comprises an output port, for example formed in a flat structural wall. In some embodiments, the output port may comprise a hydraulically or manually operated variable aperture or other metering device. In some embodiments, a discharge chute may be coupled to the output port.

Figure 7:
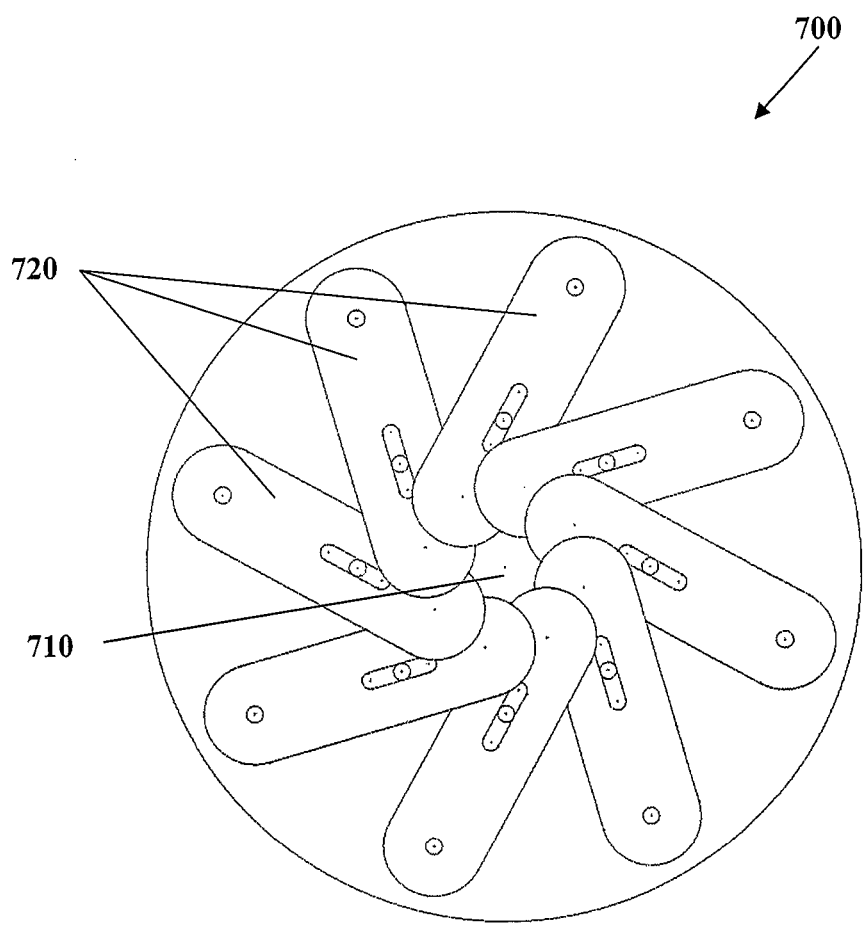
FIG. 7 illustrates a variable aperture device for operatively coupling to an output port of a mobile storage module, in accordance with embodiments of the invention.

FIG. 7 illustrates a variable aperture device 700 operatively coupled to the output port, in accordance with some embodiments. The aperture 710 may be varied in size by pivoting of a plurality of plates 720, pivotably coupled to a main body of the variable aperture device 700. The variable aperture device 700 may comprise a series of overlapping plates 720, arranged such that they form a roughly circular aperture 710 of variable radius.

In some embodiments, rapid isolation of proppant flow is effected by a gate comprising a reinforced flat plate sliding in channels perpendicular to the proppant flow and arranged such that full withdrawal of the plate allows substantially maximum flow and full insertion of the plate allows substantially no flow. This gate valve may be manually operated with a local mechanically-advantaged lever or remotely by way of a quick-acting hydraulic cylinder. Alternatively a butterfly valve may be used for this application.

Figure 8:
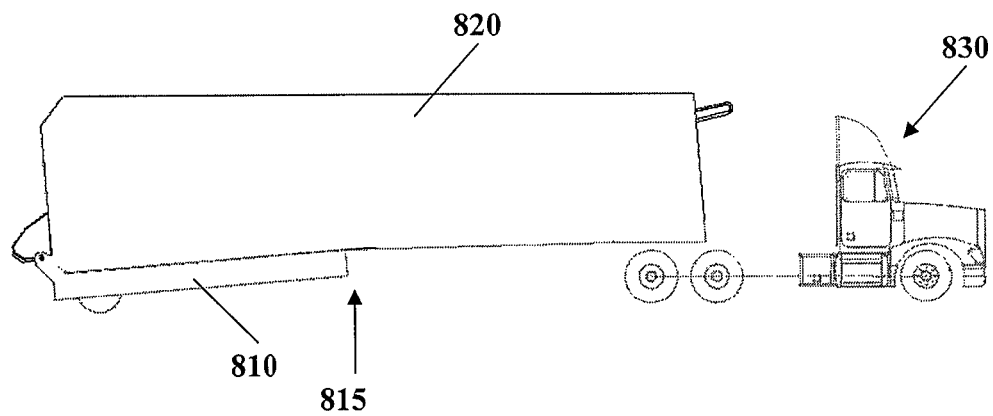
FIG. 8 illustrates a frame of a mobile storage module, in accordance with embodiments of the invention.

FIG. 8 illustrates a frame 810 of a mobile storage module, in accordance with embodiments of the present invention, which extends partway underneath the container portion 820 to an intermediate location 815. The coupler structure for coupling to the road tractor 830 may then be incorporated into the container portion 820 rather than the frame 810. This arrangement reduces weight of the mobile storage module and potentially increases allowable payload weight and/or available payload volume. In this configuration, the ground bearing envelope is reduced compared with a full-length frame, and thus additional frame surface area may be required to maintain adequately low bearing pressure. In some embodiments, the partial-length frame 810 may be configured to allow for frame adaptation to increase ground bearing area. For example, skids, deployable footings, sheeting, external supports, or the like, may be provided for this purpose.

In some embodiments, the mobile storage modules may be configured for accepting granular material from delivery vehicles other than dedicated dry-bulk proppant transporters and blowers. For example, a mobile storage module and/or in-feed elevator thereof may be adaptable or configured for use with simple belly unloading vehicles such as grain trailers, or other locally available equipment. This may allow for substantially local infrastructure and equipment, such as associated with a local agricultural industry, to service and supply proppant, or other granular material, rather than specialized, expensive equipment sourced from a central location. This may be particularly advantageous in remote locations for operational reasons such as cost and scheduling.

Delivery Module

The present invention comprises one or more delivery modules, configured to receive granular material from the mobile storage modules and to convey the granular material to a predetermined delivery location. One or more powered conveyor systems may be provided on the delivery module for conveying the granular material. Conveyance of granular material may be, at various locations, at least partially assisted by gravity, unassisted by gravity, and/or conveyed against gravity.

In embodiments of the present invention, the delivery module may be reconfigurable between a transportation configuration and an operational or site configuration. In the transportation configuration, the delivery module may be configured as a standard or over-length trailer, for example subject to one or more predetermined sets of legal and/or regulatory requirements, and/or other height, length, width and/or weight restrictions. In the operational configuration, the delivery module may be configured having a granular material reception area with surface area and capacity adequate for receiving granular material from up to a predetermined number of mobile storage modules. The delivery module may be configured, in the operational configuration, to have a lower bearing surface with a predetermined portion contacting ground, adequate for supporting the weight of the delivery module and granular material thereon against ground. Conveyors may be stowed in the transportation configuration and deployed to cover or span a greater surface area in the operational configuration.

Figure 9:
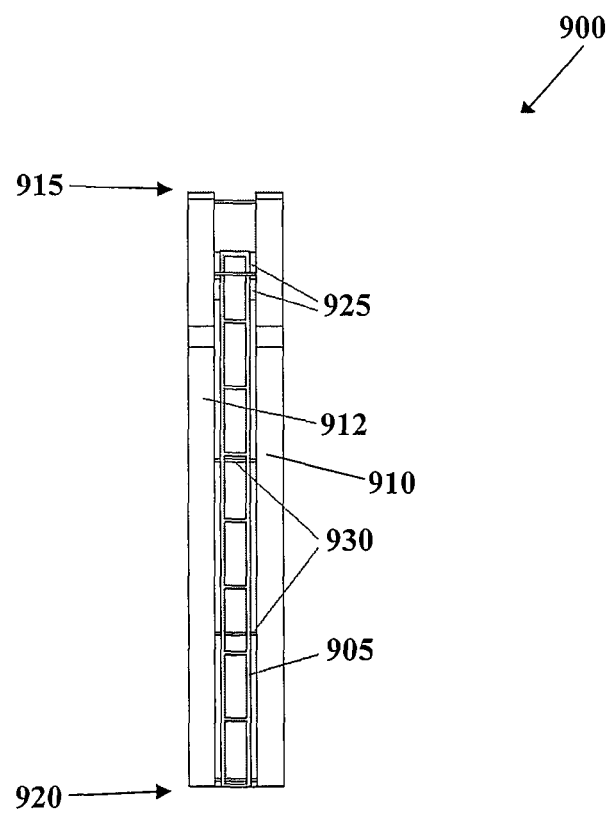
FIG. 9 illustrates a top view of a delivery module, in accordance with embodiments of the invention.

FIG. 9 illustrates a top view of a delivery module 900 in accordance with embodiments of the present invention. As illustrated, the delivery module 900 comprises a pair of main conveyors 910, 912 for receiving, granular material from the mobile storage modules and conveying same to a discharge end 915. The delivery module 900 may further comprise or be operatively coupled to one or more discharge conveyors, for example conveyors 130 as illustrated in FIG. 1.

As illustrated in FIG. 9, the delivery module 900 comprises a trailer chassis 905 upon which two main conveyors 910, 912 are mounted. Plural main conveyors may be provided for redundancy, to facilitate continued operation or failover in case of failure of one conveyor. Alternatively, a single-conveyor may be provided, which may simplify design and in some cases provide increased conveyor surface area, or more conveyors may be provided. The trailer chassis 905 may be a rock-over chassis, or other suitable frame or chassis. The delivery module may be reconfigurable between a transportation configuration and an operational or site configuration. In the operational configuration, the conveyors 910, 912 may be deployed outward relative to the transportation configuration. This configuration, in conjunction with a rock-over chassis, may facilitate deployment of the conveyors 910, 912 close to ground and outboard of the trailer chassis 905 in the operational configuration. In some embodiments, the conveyors 910, 912 may be connected to the chassis 905 via a series of laterally arranged sliding tubes spaced substantially evenly along the length of each conveyor. The sliding tubes may be deployed outward using one or more hydraulic actuators, for example. FIG. 9 also illustrates location of semi-trailer axles 925 and hydraulics 930 operatively coupled to the sliding tubes for movement thereat thereby facilitating deployment and stowage of the conveyors 910, 912.

In some embodiments, a main conveyor of the delivery module and an associated discharge conveyor may be associated via a common conveyor belt. The common conveyor belt may extend substantially horizontally over a first predetermined area associated with the main conveyor, to be situated substantially below the output ports of one or more mobile storage modules stationed around the delivery module. The common conveyor belt may further extend at an angle over a second predetermined area associated with the discharge conveyor, to raise the granular material to a predetermined height for discharge. In this manner, granular material, such as proppant, may be conveyed from output ports of the mobile storage modules and elevated to a height suitable for discharge into vehicular, or otherwise, mounted receptacles, such as blender modules.

In some embodiments, such as illustrated in FIG. 9, the delivery module conveyors 910, 912 may be carried upon a dedicated, custom configured semi-trailer chassis 905. The chassis 905 may comprise a full-length rigid frame having, at a first end 920, a standard trailer kingpin and coupler structure, or other trailer coupling components, and at a second, discharge end 915 a set of one or more axles and/or suspension assembly of the semi-trailer. As mentioned previously, the chassis 905 may be a rock-over chassis. When disconnected from the road tractor, the first end 920 of the rock-over chassis may be lowered to ground, and, the chassis lower surface may contact the ground, thereby evenly distributing load of the delivery module into the ground along the length of the rock-over chassis. In some embodiments, a suspension assembly may be located and oriented such that by deflating air springs thereof, the chassis 905 can be lowered, into contact with the ground to form a full length bearing structure.

Figure 10:
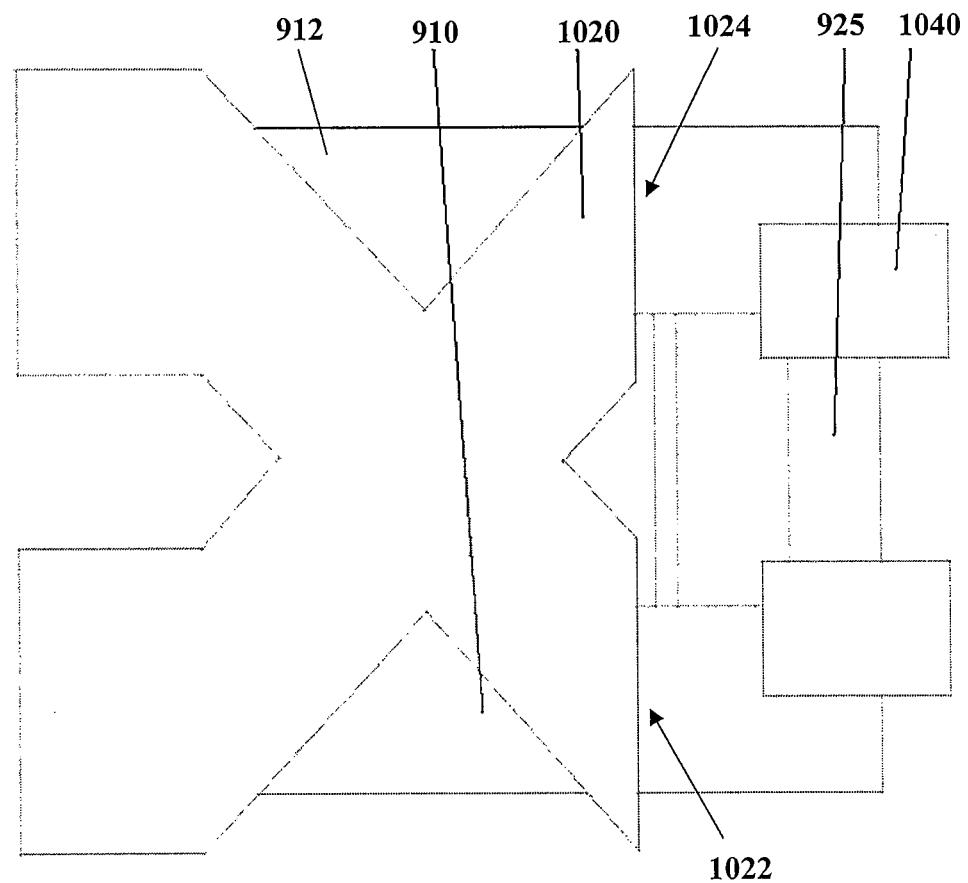
FIG. 10 illustrates an end view of a delivery module, in accordance with embodiments of the invention.

FIG. 10 illustrates an end view of a discharge end of a delivery module, in accordance with embodiments of the present invention. As illustrated, the discharge ends of a pair of conveyors 910, 912 of the delivery module may be connected by a discharge manifold 1020 extending downwards and equipped with two discharge ports 1022, 1024. The discharge manifold receives granular material from both left and right conveyors 910, 912 and selectably provides the granular material to one or both of the two discharge ports 1022, 1024. The manifold 1020 may comprise a configurable multiple orientation gate or other means for directing granular material from a selected one, or both of the conveyors 910, 912 to a selected one, or both of the two discharge ports 1022, 1024. The manifold may thereby be configured to provide flow from one or more selected conveyors to one or more selected discharge ports, and/or to blend flow from each conveyor to a selected discharge port or both discharge ports. In some embodiments, the proportions and amounts of material provided to each discharge port and/or from each conveyor may be adjusted, thereby facilitating finer control of mixing. FIG. 10 further illustrates chassis 925 and wheels 1040 of the delivery module.

Figure 11:
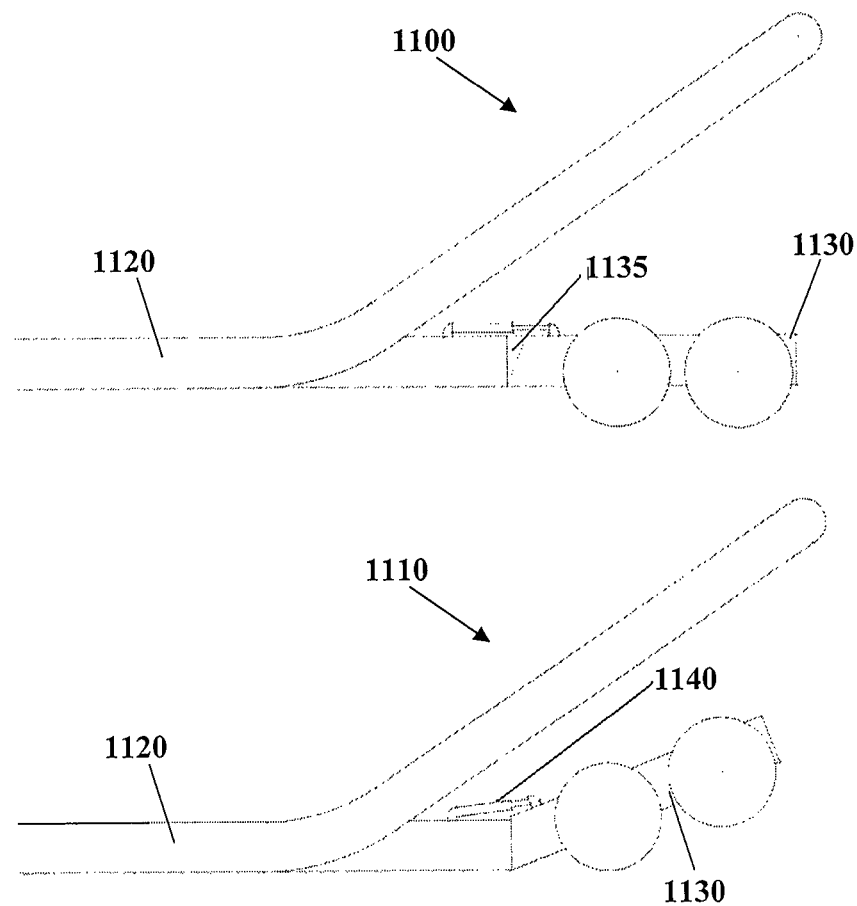
FIG. 11 illustrates a discharge end of a delivery module in both transportation and operational configurations, in accordance with embodiments of the invention.

FIG. 11 illustrates a rear/discharge end of a delivery module in both a transportation configuration 1100 and an operational configuration 1110, in accordance with embodiments of the present invention. The chassis 1120 may be pivotably coupled with a wheeled portion 1130 containing the rear axles and wheels of the delivery module semi-trailer, for example via a pin joint or other pivotable coupling. In the transportation configuration, the wheeled portion 1130 may be lowered to engage ground, for example by actuation of one or more hydraulic cylinders 1140, the chassis 1120 lifted off of ground during transport. A removable brace 1135 may be installed in a substantially triangular gap between the chassis 1120 and the wheeled portion 1130 for improved support during transport. In the operational configuration, the brace 1125 may be removed and the wheeled portion 1130 raised, for example by actuation of the one or more hydraulic cylinders 1140, and the chassis lowered to engage ground. This configuration facilitates tilting retraction of the axles for the operational configuration, thereby facilitating engagement of the chassis 1120 with the ground for load distribution. Tilting and retraction of axles may also be provided for in one or more mobile storage modules, for facilitating engagement of the frame thereof with ground to facilitate load distribution.

In some embodiments, the present invention may be configured to facilitate prevention of proppant loss, for example due to loss of proppant from conveyors or due to overflow in event of conveyor failure. For example, embodiments of the present invention comprise one or more covers, such as non-rigid covers or tarps, which may be deployed to enclose regions through which granular material is conveyed. For example, each main conveyor and/or discharge conveyor of the delivery module may be fully or partially enclosed by a cover over its length. The conveyor cover may comprise apertures at predetermined locations for receiving material from the output ports and/or discharge chutes of the mobile storage modules. One or more covers, such as fitted non-rigid cowls may be provided between the apertures of the conveyor cover and the output ports, with approximate seal at cover interfaces. In this manner, environmental contamination, such as rain or snow, may be restricted from entering the granular material as it is delivered from the mobile storage modules.

Set-up, Operation and Tear-down

Embodiments of the present invention are reconfigurable between transportation and operational configurations, thereby facilitating mobility, and relatively quick set-up and tear-down when compared with at least some prior art solutions. Each mobile storage module and delivery module may be hauled to a work site by a separate truck, for example. Embodiments of the present invention provide for a self-erecting, and substantially self-sufficient, system for storage and handling of proppant or other granular material. In some embodiments, the system may be set up on site within hours.

In some embodiments, the present invention may provide for storage and delivery capacity of suitable, for projects requiring about 50,000 cubic feet of granular material such as proppant. For example, the system may comprise plural mobile storage modules, each configured for holding up to 5,000 cubic feet of granular material, which may be discharged by gravity to a delivery module. Ten mobile storage modules so configured may thus provide about 50,000 cubic feet of granular material. The rate at which granular material may be supplied may also scale with the number of mobile storage modules used, subject to capacity of the distribution module arrangement in use. More or fewer mobile storage modules may also be provided, thereby making the system scalable as required by an operation. Each delivery module may be capable of servicing up to a predetermined number of mobile storage modules. Thus, in some embodiments, plural delivery modules may be provided, end-to-end or in parallel, to satisfy operational requirements.

In embodiments of the present invention, one or more modules, such as mobile storage modules and delivery modules, may be powered by self-contained hydraulic, power packs, or other appropriate sources of fluid or mechanical power. Each module may be powered by its own power pack, with power packs being interchangeable between modules in case of failure events. Each power pack may comprise a prime mover, such as a combustion engine, a hydraulic pump, a hydraulic reservoir and associated filtering, plumbing and control valves, and possibly other components configured together for supplying hydraulic power. In some configurations, plural modules can operate independently, but the hydraulic power packs may be configured to allow cross connection between modules or to auxiliary equipment as may be required. In some embodiments, each module having its own power pack may be operable independently. This reduces requirements for external lifting equipment or power sources, which may not be readily available on site.

Figure 12:
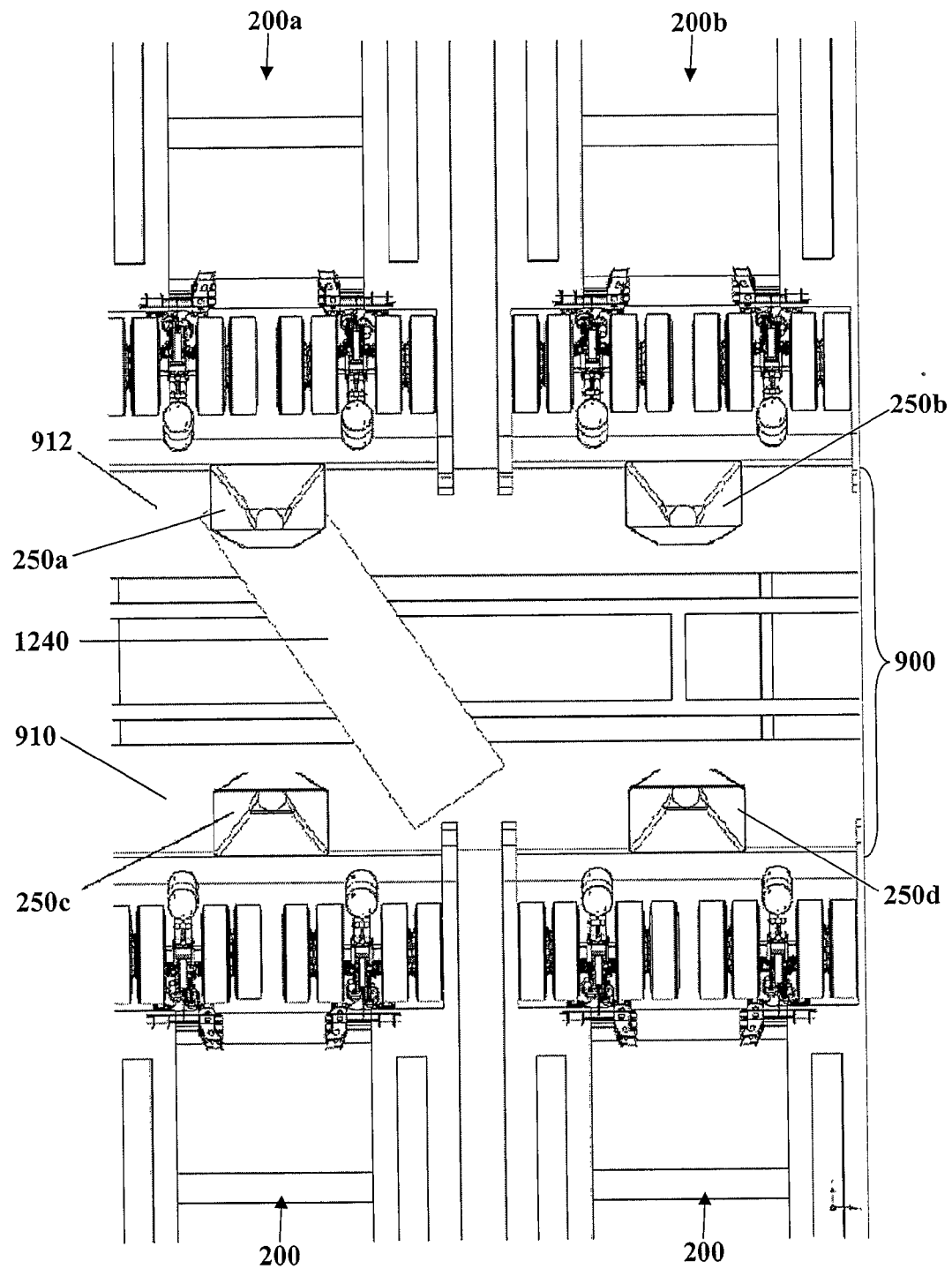
FIG. 12 illustrates a partial top view of a system for handling granular material, in accordance with embodiments of the invention.

FIG. 12 illustrates a partial top view of a system for handling granular material in accordance with the present invention. The system comprises a plurality of mobile storage modules 200a, 200b, 200c, 200d arranged around a delivery module 900. Each mobile storage module 200a, 200b, 200c, 200d comprises a discharge chute 250a, 250b, 250c, 250d, respectively. A first pair of discharge chutes 250a, 250b are positioned overtop of a first conveyor 912 of the delivery module, and a second pair of discharge chutes 250c, 250d are positioned overtop of a second conveyor 910 of the delivery module. During normal operation, the first pair of discharge chutes 250a, 250b discharge granular material onto the first conveyor 912, and the second pair of discharge chutes 250c, 250d discharge granular material onto the second conveyor 910. Granular material is then conveyed to a discharge end of the delivery module. A crossover conveyor 1240 may be provided as shown should the first conveyor 912 fail. The crossover conveyor 1240 may have a first end which may be oriented under the discharge chute 250a or another chute, and a second end overtop of the second conveyor. The crossover conveyor 1240 may thus be configured to convey material from the discharge chute 250a to the second conveyor 910, thereby bypassing the first conveyor 912 in the event of failure thereof. One or more crossover conveyors may be provided which may be oriented and/or re-oriented as needed between a selected discharge chute and a selected conveyor.

Uses

Embodiments of the present invention may be used for storing and delivering proppant for drilling by hydraulic fracturing, for example for oil and gas drilling, shale drilling, and the like. In accordance with some embodiments, the present invention may be configured to convey the proppant material, via the delivery module, to one or more blender modules. The blender modules may receive and combine the proppant with water and possibly other chemicals to create slurry which is then provided to one or more hydraulic fracturing pumps for pumping into a well borehole for drilling.

In some embodiments, the present invention may be employed as a material storage and metering device for granular or flow-able materials other than proppant, and/or in applications other than well stimulation. For example, embodiments of the present invention may be employed to receive, store and convey a predetermined granular material in applications such as agriculture, in construction, road sanding and salting, and the like. In some embodiments, the present invention may be configured for water recovery storage for slick water fracking operations.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A system for handling granular material, the system comprising:
    a. a delivery module configured, in a delivery module operational configuration, to receive said granular material and to convey said granular material to a predetermined delivery location via a continuous belt conveyor;

b. one or more mobile storage modules adjacent to the delivery module, each of the one or more mobile storage modules configured, in a mobile storage module operational configuration, to hold and dispense said granular material downward to the delivery module and to receive said granular material for holding via a continuous belt loading system operatively coupled to an input port, the continuous belt loading system being separated from the continuous belt conveyor by the mobile storage module;

wherein the delivery module is mobile and reconfigurable between said delivery module operational configuration and a delivery module transportation configuration and wherein each of the one or more mobile storage modules comprises an integrated actuating system for moving a container portion thereof between a lowered position and a raised position, the raised position corresponding to the mobile storage module operational configuration, and wherein each of the one or more mobile storage modules further comprises:
a. a frame;
b. the container portion supported by the frame and pivotably coupled thereto, the container portion configured to store said granular material and comprising the input port for receiving said granular material and an output port for dispensing said granular material; and
c. the integrated actuating system configured to pivot the container portion between the lowered position and a the raised position, wherein, in the raised position, the input port is located above the output port.

2. The system of claim 1, wherein each of the one or more mobile storage modules are reconfigurable between said mobile storage module operational configuration and a mobile storage module transportation configuration, the one or more mobile storage modules towable as separately transportable trailers in the mobile storage module transportation configuration.

3. The system of claim 1, wherein each of the one or more mobile storage modules further comprises a loading system configured to convey said granular material thereto.

4. The system of claim 1, wherein the delivery module is towable as a separately transportable trailer in the delivery module transportation configuration.

5. The system of claim 1, wherein the delivery module comprises two or more powered conveyor systems and a crossover conveyor system, the crossover conveyor system configurable to bypass one of the two or more powered conveyor systems.

6. The system of claim 1, wherein the one or more storage modules includes two or more mobile storage modules stationed along one or more sides of the delivery module in the mobile storage module operational configurations.

7. The system of claim 1, wherein the one or more mobile storage modules includes two or more mobile storage modules which comprise interchangeable components.

8. The system of claim 1, wherein at least one of the delivery module and the one or more mobile storage modules comprises a chassis, the chassis reconfigurable between a semi-trailer chassis for transportation and a bearing surface for support against ground during operation.

9. The system of claim 8, wherein reconfiguration of the chassis comprises lowering of a front portion of the chassis to contact the ground.

10. The system of claim 8, wherein the chassis comprises a wheeled portion movable relative to a bearing surface portion between a first position and a second position, the wheeled portion configured to engage the ground in the first position for transportation, the wheeled portion configured to retract from the ground in the second position to facilitate engagement of the ground by the bearing surface portion.

11. The system according to claim 1, wherein said granular material flows continuously downward from the input port to the output port, wherein each of the one or more mobile storage modules are reconfigurable between said mobile storage module operational configuration and a mobile storage module transportation configuration, said reconfiguring including said pivoting of the container portion between the lowered position and the raised position, and wherein reconfiguration of the mobile storage module from the transportation configuration to the operational configuration refrains from elevation of the output port.

12. The system according to claim 1, wherein the integrated actuating system comprises a hydraulic cylinder coupled at a first end to the frame and at a second end to the container portion at a location distal from the frame, thereby orienting the hydraulic cylinder at an angle away from horizontal in both the lowered position and the raised position of the container portion.

13. A mobile storage module for providing granular material to an adjacent delivery module, the mobile storage module configured, in a mobile storage module operational configuration, to hold and dispense said granular material downward to the adjacent delivery module, and to receive said granular material for holding via a continuous belt loading system operatively coupled to an input port, the continuous belt loading system being separated from the adjacent delivery module, wherein the mobile storage module comprises an integrated actuating system for moving a container portion thereof between a lowered position and a raised position, the raised position corresponding to the mobile storage module operational configuration, the mobile storage unit comprising:
a. a frame;
b. the container portion supported by the frame and pivotably coupled thereto, the container portion configured to store said granular material and comprising the input port for receiving said granular material and an output port for dispensing said granular material; and
c. the integrated actuating system configured to pivot the container portion between the lowered position and the raised position, wherein, in the raised position, the input port is located above the output port.

14. The mobile storage module of claim 13, wherein the mobile storage module is reconfigurable between said mobile storage module operational configuration and a mobile storage module transportation configuration, the mobile storage module towable as a trailer in the mobile storage module transportation configuration.

15. The mobile storage module of claim 13, the mobile storage module comprising a loading system configured to convey said granular material thereto.

16. The mobile storage module of claim 13, the mobile storage module comprising a chassis, the chassis reconfigurable between a semi-trailer chassis for transportation and a bearing surface for support against ground during operation.

17. The mobile storage module of claim 16, wherein reconfiguration of the chassis comprises lowering of a front portion of the chassis to contact the ground.

18. The mobile storage module of claim 16, wherein the chassis comprises a wheeled portion movable relative to a bearing surface portion between a first position and a second position, the wheeled portion configured to engage the ground in the first position for transportation, the wheeled portion configured to retract from the ground in the second position to facilitate engagement of the ground by the bearing surface portion.

19. A method for handling granular material, the method comprising:
   a. providing a delivery module configured in a delivery module operational configuration, to receive granular material and to convey said granular material to a predetermined delivery location via a continuous belt conveyor; and
   b. providing one or more mobile storage modules adjacent to the delivery module, each of the one or more mobile storage modules configured in a mobile storage module operational configuration, to hold and dispense said granular material downward to the delivery module, and to receive said granular material for holding via a continuous belt loading system operatively coupled to an input port, the continuous belt loading system being separated from the continuous belt conveyor by the mobile storage module;
      wherein the delivery module is mobile and reconfigurable between said delivery module operational configuration and a delivery module transportation configuration and wherein each of the one or more mobile storage modules comprises an integrated actuating system for moving a container portion thereof between a lowered position and a raised position, the raised position corresponding to the mobile storage module operational configuration, and
      wherein each of the one or more mobile storage modules comprises
         a. a frame;
         b. the container portion supported by the frame and pivotably coupled thereto, the container portion configured to store said granular material and comprising the input port for receiving said granular material and an output port for dispensing said granular material; and
         c. the integrated actuating system configured to pivot the container portion between the lowered position and the raised position, wherein, in the raised position, the input port is located above the output port.

20. The method according to claim 19, wherein each of the one or more mobile storage modules are reconfigurable between a mobile storage module operational configuration and a mobile storage module transportation configuration, the one or more mobile storage modules towable as separately transportable trailers in the mobile storage module transportation configuration, the method further comprising:
   a. transporting the one or more mobile storage modules to positions adjacent to the delivery module in the mobile storage module transportation configuration; and
   b. reconfiguring the one or more mobile storage modules to the mobile storage module operational configurations.

* * * * *